US009424360B2

(12) United States Patent
Goel et al.

(10) Patent No.: US 9,424,360 B2
(45) Date of Patent: Aug. 23, 2016

(54) RANKING EVENTS (71) Applicant: GOOGLE INC., Mountain View, CA (US)

(72) Inventors: Kavi J. Goel, San Francisco, CA (US); Toshihiro Yoshino, Tokyo (JP); Yang-hua Chu, Menlo Park, CA (US); Hidetoshi Shimokawa, Tokyo (JP); Slaven Bilac, Tokyo (JP); Mingmin Xie, Tokyo (JP); Satoru Yamauchi, Tokyo (JP)

(73) Assignee: Google Inc., Mountain View, CA (US)

( * ) Notice: Subject to any disclaimer, the term of this patent is extended or adjusted under 35 U.S.C. 154(b) by 494 days.

(21) Appl. No.: 13/795,833

(22) Filed: Mar. 12, 2013

(65) Prior Publication Data
US 2015/0161128 A1 Jun. 11, 2015

(51) Int. Cl.
*G06F 17/30* (2006.01)

(52) U.S. Cl.
CPC ...... *G06F 17/3087* (2013.01); *G06F 17/30905* (2013.01)

(58) Field of Classification Search
None
See application file for complete search history.

(56) References Cited

U.S. PATENT DOCUMENTS

| 6,012,053 | A * | 1/2000 | Pant | G06F 17/30696 |
| 7,895,225 | B1 * | 2/2011 | Thirumalai | G06F 17/301 707/748 |
| 7,933,897 | B2 | 4/2011 | Jones et al. | |
| 8,051,076 | B1 * | 11/2011 | Garg et al. | 707/723 |
| 8,065,301 | B2 * | 11/2011 | Ginsburg | G06F 17/30864 707/736 |
| 8,484,199 | B1 | 7/2013 | Katragadda et al. | |
| 8,635,212 | B1 * | 1/2014 | Bunn | G06F 17/30867 707/706 |
| 8,666,914 | B1 * | 3/2014 | Dupin | G06F 17/30687 706/12 |
| 8,694,529 | B1 * | 4/2014 | Hotchkies | G06F 17/30693 707/766 |
| 8,700,540 | B1 * | 4/2014 | Zambrano | G06Q 50/01 705/319 |
| 8,751,492 | B1 * | 6/2014 | Catane | 707/734 |
| 2004/0002848 | A1 * | 1/2004 | Zhou | G06F 17/2827 704/2 |
| 2005/0120311 | A1 * | 6/2005 | Thrall | G06F 17/30867 715/811 |
| 2005/0181765 | A1 * | 8/2005 | Mark | G06Q 10/10 455/411 |
| 2005/0198268 | A1 * | 9/2005 | Chandra | G06F 17/30864 709/224 |

(Continued)

*Primary Examiner* — Mariela Reyes
*Assistant Examiner* — Edward Jacobs
(74) *Attorney, Agent, or Firm* — Fish & Richardson P.C.

(57) ABSTRACT

Methods, systems, and apparatus, including computer programs encoded on a computer storage medium, for ranking events. One of the methods includes receiving data identifying a physical location; obtaining data identifying a plurality of events occurring in the physical location during a particular time period; computing a respective plurality of signal scores for each of the events, wherein computing the respective plurality of signal scores for each of the events comprises computing a first signal score for each of the events based at least in part on a count of Internet sites that include at least one mention of the event; computing a respective popularity score for each of the plurality of events by combining the respective plurality of signal scores for the event; and generating a ranking of events occurring in the physical location during the particular time period based at least in part on the popularity scores.

25 Claims, 4 Drawing Sheets

(56) References Cited

U.S. PATENT DOCUMENTS

| | | | |
|---|---|---|---|
| 2006/0004560 A1* | 1/2006 | Whitelock | G06F 17/2827 704/2 |
| 2007/0136272 A1* | 6/2007 | Tveit | G06F 17/30864 |
| 2007/0162448 A1* | 7/2007 | Jain | G06F 17/30625 |
| 2008/0016101 A1* | 1/2008 | Ginsburg | G06F 17/30864 |
| 2008/0071638 A1* | 3/2008 | Wanker | G06Q 30/02 705/7.32 |
| 2008/0071763 A1* | 3/2008 | Ferrenq | G06F 17/30867 |
| 2008/0114749 A1* | 5/2008 | Chandhok et al. | 707/5 |
| 2008/0256050 A1* | 10/2008 | Zhang | G06F 17/30867 |
| 2009/0006388 A1* | 1/2009 | Ives | G06F 17/30864 |
| 2009/0055338 A1* | 2/2009 | Kellogg | G06N 5/02 706/46 |
| 2009/0063464 A1* | 3/2009 | Chang | G06F 17/30864 |
| 2009/0265344 A1* | 10/2009 | Etoh | G06F 17/30864 |
| 2010/0057724 A1* | 3/2010 | Matsumura | G06F 17/30731 707/E17.017 |
| 2010/0325205 A1* | 12/2010 | Murphy | G06Q 10/10 709/204 |
| 2011/0029509 A1* | 2/2011 | Kumthekar | G06F 17/30867 707/723 |
| 2011/0040656 A1* | 2/2011 | Groetzinger et al. | 705/27.1 |
| 2011/0238288 A1 | 9/2011 | Li et al. | |
| 2011/0289065 A1* | 11/2011 | Wells | 707/706 |
| 2011/0302153 A1* | 12/2011 | Meretakis | G06F 17/30864 707/722 |
| 2012/0028643 A1* | 2/2012 | Falchuk | H04W 48/16 455/436 |
| 2012/0089601 A1* | 4/2012 | Bailey | G06F 17/30864 707/723 |
| 2012/0221362 A1* | 8/2012 | Nezer | G06Q 10/02 705/5 |
| 2012/0317087 A1 | 12/2012 | Lymberopoulos et al. | |
| 2013/0024431 A1* | 1/2013 | Parthasarathy et al. | 707/692 |
| 2013/0060744 A1* | 3/2013 | Roychoudhuri | G06F 17/30867 707/706 |
| 2013/0103697 A1 | 4/2013 | Hill et al. | |
| 2013/0262439 A1* | 10/2013 | Hao | G06F 17/3064 707/722 |
| 2014/0012926 A1* | 1/2014 | Narayanan | G06Q 50/01 709/206 |
| 2014/0149372 A1* | 5/2014 | Sankar | G06F 17/30864 707/706 |
| 2014/0181192 A1* | 6/2014 | Sankar | H04L 67/22 709/204 |
| 2014/0188839 A1* | 7/2014 | Nielsen | G06F 17/30867 707/711 |
| 2014/0250115 A1* | 9/2014 | Yang | G06F 17/3053 707/728 |

* cited by examiner

RANKING EVENTS

BACKGROUND

This specification relates to digital data processing and, in particular, to ranking events occurring in physical locations.

Events are occurrences that happen at a specified physical location and for a specified period of time. For example, music concerts, art exhibits, and athletic contests are all events that happen for specified periods of times at specified physical locations, e.g., at a particular venue (e.g., a concert hall, a gallery, a stadium, or a museum), and can be attended in person by music lovers, sports fans, and other individuals.

Since many events in a geographic region can happen at the same time or at overlapping times, interested individuals may at times find it difficult to determine which events to attend. For example, individuals may be unaware that events of interest are scheduled to occur or may have difficulty identifying the most interesting events when multiple events are occurring.

SUMMARY

In general, one aspect of the subject matter described in this specification can be embodied in methods that include the actions of receiving data identifying a physical location; obtaining data identifying a plurality of events occurring in the physical location during a particular time period; computing a respective plurality of signal scores for each of the events, wherein computing the respective plurality of signal scores for each of the events comprises computing a first signal score for each of the events based at least in part on a count of Internet sites that include at least one mention of the event; computing a respective popularity score for each of the plurality of events by combining the respective plurality of signal scores for the event; and generating a ranking of events occurring in the physical location during the particular time period based at least in part on the popularity scores. Other embodiments of this aspect include corresponding systems, apparatus, and computer programs, configured to perform the actions of the methods, encoded on computer storage devices.

These and other embodiments can each optionally include one or more of the following features. Generating the ranking of events occurring in the physical location during the particular time period based on the popularity scores can include: generating an initial ranking of events based on the popularity scores; computing a respective modified popularity score for each of the events based on the initial ranking; and generating the ranking of events occurring in the physical location by ranking the events according to the modified popularity scores.

Computing the modified popularity score for each of the events can include: obtaining data identifying a respective category to which each of the events belongs; computing a respective demotion value for each of the events based at least in part on a count of higher-ranked events belonging to the same category as the event, wherein the higher-ranked events are events ranked above the event in the initial ranking of events; and generating the respective modified popularity score for each of the events by applying the demotion value for the event to the popularity score for the event.

Computing the respective demotion value for each of the events can include: computing the respective demotion value based in part on a count of higher-ranked events that are similar events to the event. Computing the first signal score for the event can include: determining, of the Internet sites including at least one mention of the event, a number that have been classified as ticket selling sites; and computing the first signal score based at least in part on the count of Internet sites including at least one mention of the event and the number that have been classified as ticket selling sites.

Computing the respective plurality of signal scores for each of the events can further include: determining whether the event has an official web page; when the event has an official web page, determining a peak number of user selections of the official web page over a predetermined duration of time; determining a measure of relevance of the official web page to the event; and computing a second signal score of the plurality of signal scores for the event based at least in part on the peak number of user selections and the relevance measure.

Computing the respective plurality of signal scores for each of the events can further include: obtaining data identifying one or more entities that are relevant to the event; determining a measure of global popularity of each of the entities; and computing a third signal score of the plurality of signal scores for the event based at least in part on the measures of global popularity of the entities that are relevant to the event.

Computing the respective plurality of signal scores for each of the events can further include: obtaining data identifying one or more event categories that are relevant to the event; determining whether any of the event categories that are relevant to the event have been classified as promoted or demoted categories; and computing a fourth signal score of the plurality of signal scores for the event based at least in part on whether any of the event categories have been classified as promoted or demoted categories.

Computing the respective plurality of signal scores for each of the events can further include: obtaining search results for a search query that includes a first term identifying the physical location and a second term indicating an interest in events occurring in the physical location; determining a position in a ranking of the search results of a highest-ranked search result that mentions the event; determining a frequency with which the event is mentioned in the search results; and computing a fifth signal score of the plurality of signal scores for the event based at least in part on position of the highest-ranked search result that mentions the event and the frequency with which the event is mentioned in the search results.

Computing the respective plurality of signal scores for each of the events can further include: obtaining data identifying a venue hosting the event; obtaining data identifying a seating capacity of the venue; and computing a sixth signal score of the plurality of signal scores for the event based at least in part on the seating capacity of the venue.

Particular embodiments of the subject matter described in this specification can be implemented so as to realize one or more of the following advantages. Events in a given location can be ranked so that popular or interesting events can be easily identified. The ranking can be adjusted to ensure that highly-ranked events are diverse and different from one another. Events matching a variety of event criteria can be ranked so that popular or interesting events can be easily identified. The ranking can be provided to other systems or services that can use the ranking to enhance the user experience. For example, a search engine can use the ranking to identify the most popular events that are relevant to a received search query and present the most popular events to the user in response to the received query. As another example, a recommendation engine can use the ranking to provide information identifying popular or interesting events to users that match the users' interests.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
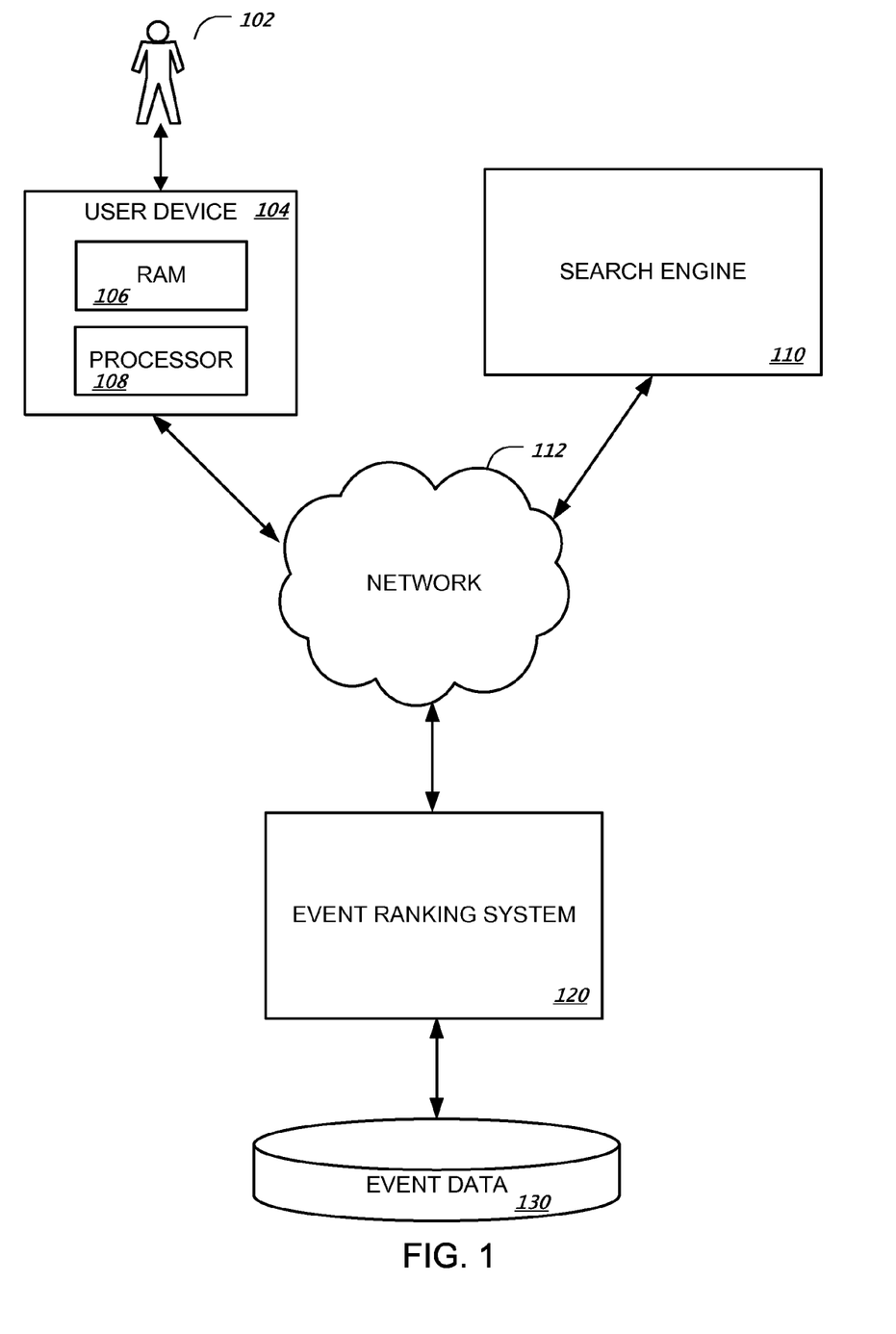
FIG. 1 shows an example event ranking system.

FIG. 1 shows an example event ranking system 120. The event ranking system 120 is an example of a system implemented as computer programs on one or more data processing apparatus in one or more geographic locations, in which the systems, components, and techniques described below can be implemented.

A user 102 can interact with the event ranking system 120 or a search engine 110 through a user device 104. The user device 104 will generally include a memory, e.g., a random access memory (RAM) 106, for storing instructions and data and a processor 108 for executing stored instructions. The memory can include both read only and writable memory. For example, the user device 104 can be a data processing apparatus coupled to the event ranking system 120 or the through a data communication network 112, e.g., local area network (LAN) or wide area network (WAN), e.g., the Internet, or a combination of networks, any of which may include wireless links.

The search engine 110 is implemented on one or more data processing apparatus in one or more physical locations and provides search results in response to received search queries. For example, in response to a search query received from the user device 104, the search engine 110 can use a resource index to identify resources that are relevant to the query. The resources are each associated with a resource address and can include, for example, HyperTextMarkup Language (HTML) pages, word processing documents, portable document format (PDF) documents, images, video, and feed sources.

The search engine 110 generates search results that identify the relevant resources and returns the search results to the user device 104. The search engine 110 ranks the search results, i.e., places the search results in an order, according to respective scores associated with the resources identified by the search results. The scores are generated using a scoring function and generally relate to the quality, the relevance, or both of the resource.

The event ranking system 120 can receive requests, e.g., from the user device 102 or from the search engine 110, for events that match one or more event criteria. In response, the event ranking system 120 can identify events from an event data store 130 that satisfy the event criteria and generate a ranking for the events. The event data store 130 can be one or more data stores in one or more locations that store information identifying events taking place in various physical locations, e.g., countries, cities, states, or neighborhoods. Generally, the events identified in the event data store 130 are occurrences that happen at a specified physical location and for a specified period of time.

The event data store can also store information about the events. For example, the event data store can store data identifying the venue hosting the event, the event category that the event belongs to, e.g., concert, sporting event, festival, fair, or trade show, a summary that describes the event, and values of one or more attributes of the event, e.g., whether the event is indoors or outdoors, the cost to attend the event, whether a ticket must be purchased in advance, and so on.

Generating a ranking for events that match event criteria is described in more detail below with reference to FIGS. 2-4.

Figure 2:
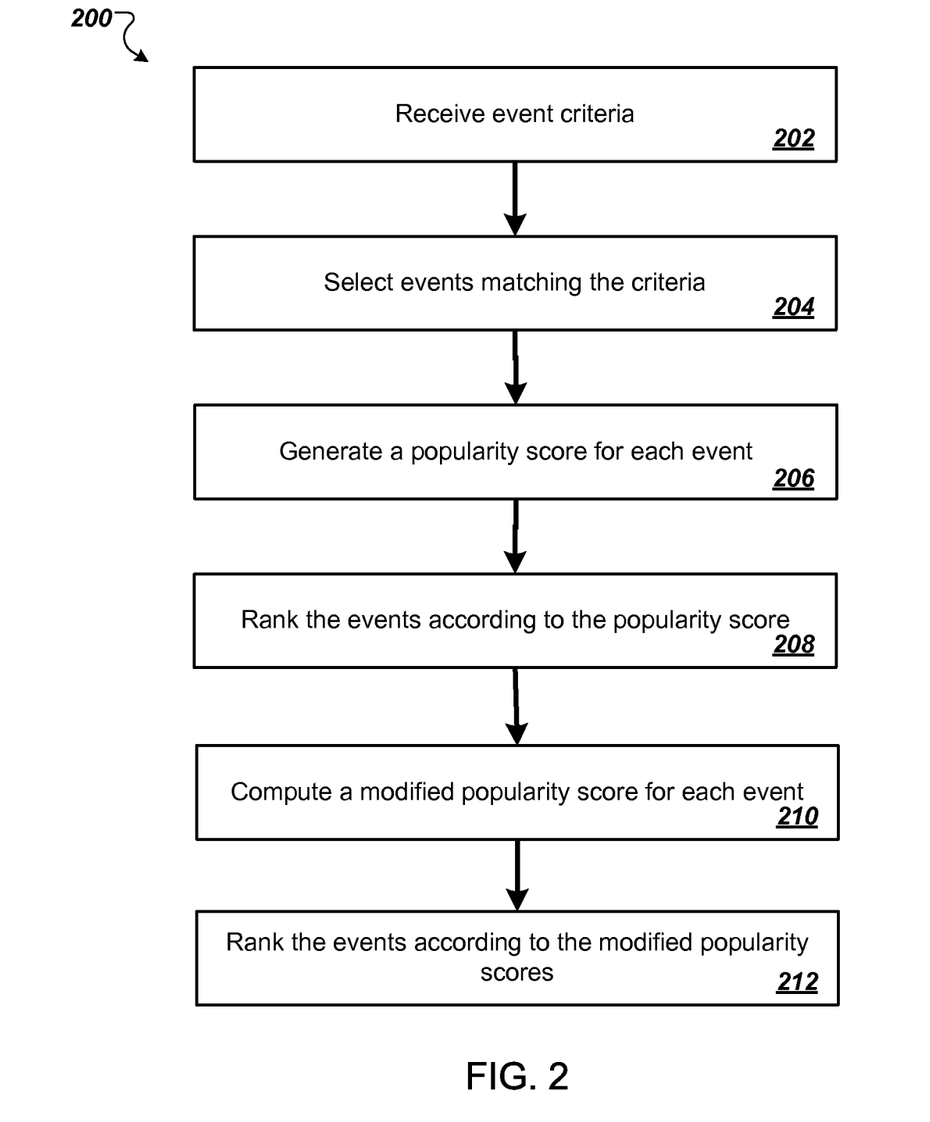
FIG. 2 is a flow diagram illustrating an example technique for ranking events that satisfy received event criteria.

FIG. 2 is a flow diagram illustrating an example technique 200 for ranking events that satisfy received event criteria. The technique 200 can be performed by one or more data processing apparatus. For example, an event ranking system (e.g., the event ranking system 120 of FIG. 1) can be used to perform the technique 200.

The system receives event criteria (202). The event criteria specify a physical location, e.g., a city, a specific neighborhood within a city, or a geographic radius, and, optionally, a time period during which matching events must occur. If the event criteria do not specify a time period, the system can select a default time period, e.g., the next week, the next day, or the next weekend. Optionally, the event criteria may specify an event category to which matching events must apply, e.g., the event criteria may specify that the event has to belong to a "concert" or a "sporting event" category. Further optionally, the event criteria may specify an attribute value that matching events must possess, e.g., the criteria may specify that a cost of attendance attribute have the value "free" or that an indoor or outdoor event attribute have the value "outdoor." Further optionally, the event criteria may specify one or more terms that must be included in a title, description, or both, of a matching event, e.g., the criteria may specify that "Halloween" must be included in the title of each matching event.

The system selects events matching the event criteria (204) from events identified in an event data store, e.g., the event data store 130 of FIG. 1.

The system computes a popularity score for each selected event (206) and ranks the events according to their popularity scores (208). Generating a popularity score for an event is described in more detail below with reference to FIG. 3.

The system computes a modified popularity score for each event (210) and ranks the events according to the modified popularity scores (212). Computing a modified popularity score is described in more detail below with reference to FIG. 4. In some implementations, the system can compute modified popularity scores and re-rank the events multiple times, e.g., by performing the technique described below with reference to FIG. 4 multiple times, in order to determine the final ranking of the events.

Once the system has ranked the events according to the modified popularity scores, the system can provide data identifying the ranking of the events to, e.g., a search engine or a user device in response to an event request. If the system provides the data to a search engine, the search engine may then further modify the ranking, e.g., based on a received search query, and then provide the ranking for display to a user, e.g., as part of a response to the received search query.

Figure 3:
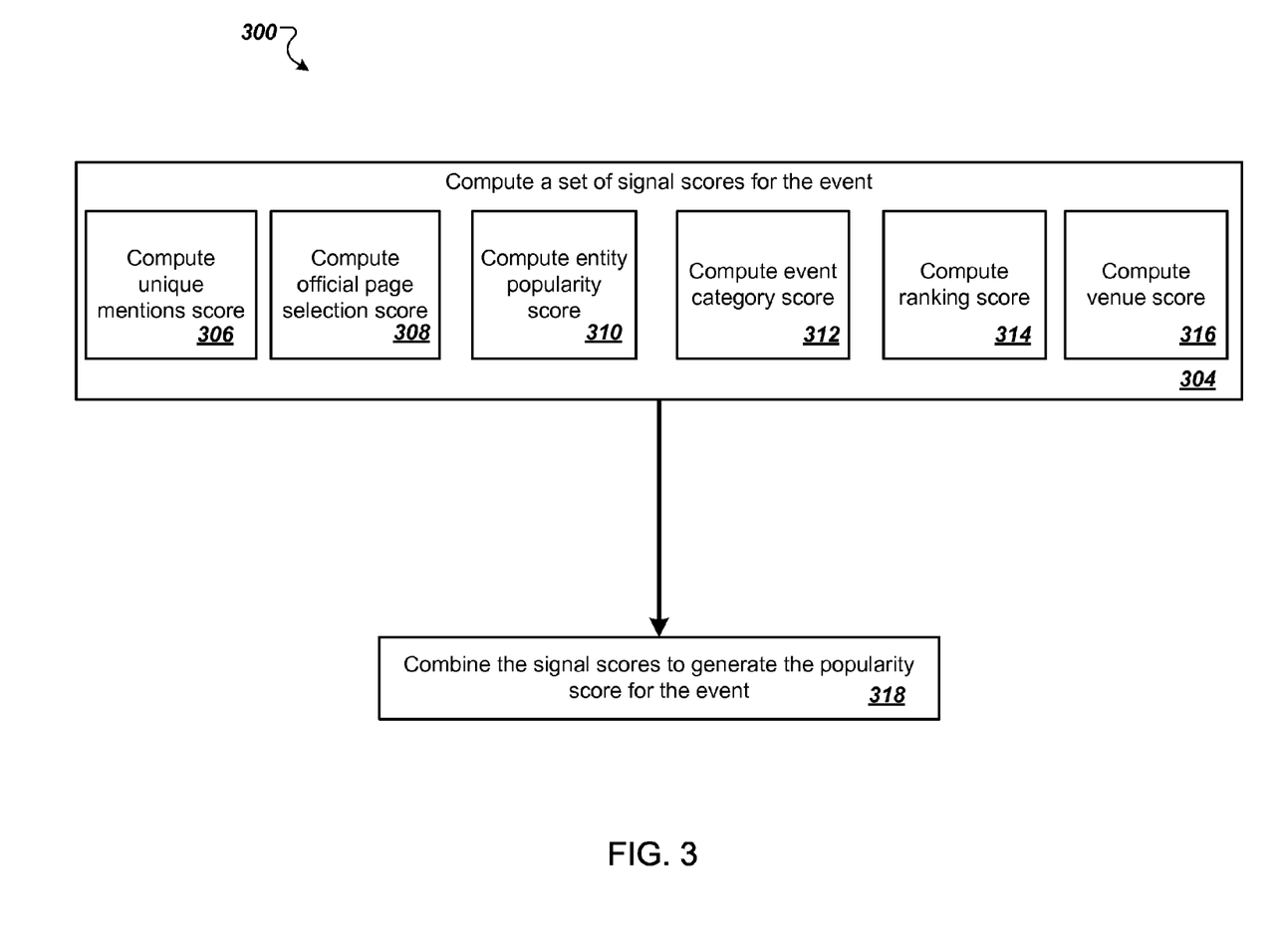
FIG. 3 is a flow diagram illustrating an example technique for generating a popularity score for an event.

FIG. 3 is a flow diagram illustrating an example technique 300 for generating a popularity score for an event. The technique 300 can be performed by one or more data processing apparatus. For example, an event ranking system (e.g., the event ranking system 120 of FIG. 1) can be used to perform the technique 300.

The system computes a set of signal scores for the event (304). That is, the system computes multiple scores for the event, with each score being computed based on a respective signal generated or obtained by the system.

In some implementations, the system computes a unique mentions score as one of the signal scores (306). The unique mentions score is a measure of how frequently the event is mentioned in Internet resources. In particular, the system computes the unique mentions score based on a count of Internet sites that include at least one mention of the event, with a mention of an event being an occurrence of a recognized reference to the event in the contents of a resource that is part of the site.

The system can be configured to treat different kinds of collections of resources as a site. For example, the system can treat as a site a collection of resources that are hosted on a particular server. In that case, resources in a site can be accessed through a network, e.g., the Internet, using an Internet address, e.g., a Uniform Resource Locator (URL), corresponding to a server on which the site is hosted. Alternatively or in addition, a site can be defined operationally as the resources in a domain, e.g., "example.com," where the resources in the domain, e.g., "host.example.com/resource1," "www.example.com/folder/resource2," or "example.com/resource3," are in the site. Alternatively or in addition, a site can be defined operationally using a subdomain, e.g., "www.example.com," where the resources in the subdomain, e.g., "www.example.com/resource1" or "www.example.com/folder/resource2," are in the site. Alternatively or in addition, a site can be defined operationally using a subdirectory, e.g., "example.com/subdirectory," where the resources in the subdirectory, e.g., "example.com/subdirectory/resource.html," are in the site.

In some implementations, the system can classify certain sites as being ticketing sites, i.e., sites that sell tickets to events. For example, the system can classify as ticketing sites site having a URL that includes one or more predetermined white-listed terms that have been determined to be ticketing related, e.g., "ticket" or "coupon." In these implementations, the system can compute the unique mentions score based on the count of sites that include at least one mention of the event and on how many of the sites that include at least one mention of the event are ticketing sites. For example, the unique mentions score UM may be computed such that:

$$UM=\ln(e+sc*dem),$$

where sc is the count of sites that include at least one mention of the event, and dem is a demotion calculated based on the ratio of sites that include at least one mention of the event that have been classified as ticketing sites. The demotion can be computed so that events that have a higher ratio of ticketed sites will have a smaller demotion value, i.e., have their unique mentions score decreased more, than events that have a lower ratio of ticketed sites. In some implementations, the demotion is computed so that it does not fall below a predetermined minimum value.

In some implementations, the system computes an official page selection score as one of the signal scores (308). The official page selection score is a measure of how frequently users select search results identifying a resource that has been classified by the system as the official web page of the event. A user selection of a search result can be, e.g., a user action made with respect to the search result that initiates a request for the resource identified by the search result. For example, the user action with respect to the search result may be a "click" on the search result, a voice-based selection, or a selection by a user's finger on a presence-sensitive input mechanism, e.g., a touch-screen device, or any other appropriate selection mechanism. In some implementations, selection data may not be tethered to the identity of individual users.

In particular, the official page selection score may be computed based in part on a peak number of user selections of search results identifying the official page during a time window of predetermined size, e.g., a day or a week. Optionally, the system can consider only windows during a recent time period, e.g., the past week or the past month, when determining the peak number of selections. Further optionally, if the event is a recurring event, the system can decrease the peak number of user selections that are counted for the event, e.g., by dividing the number of selections counted for the event by the number of recurrences of the event during the recent time window that is being considered by the system.

In some implementations, the system has access to data that classifies certain terms as being related to resources. For example, the related terms for a given resource can be query terms from search queries that have frequently resulted in users selecting a search result identifying the resource. The data stored in the event data store for the event may also identify terms that are related to the event. In these implementations, the system may compute a relevance measure that measures how relevant the official web page for the event is to the event. The relevance measure can be computed based on how similar the terms that are related to the official web page are to the terms that are related to the event. For example, the relevance measure can be a cosine distance between vectors that representing the terms that relate to the official web page and vectors representing the terms that relate to the event.

In these implementations, the official page selection score OP may be computed such that:

$$OP=K_a*e^{\wedge}(K_b*e^{\wedge}(K_c*ps*rel))+K_d,$$

where $K_a$, $K_b$, $K_c$, and $K_d$ are constant values, ps is the peak number of selections and rel is the relevance measure. If no resource has been classified as the official page for the event, the system can set the official page selection score equal to a default value.

The system can determine the official web page for the event in any of a variety of ways. For example, the system can generate one or more search queries derived from terms that are relevant to the event. For example, the search queries can include any of a name of the event, a location of the event, the venue of the event, the time of the event, and descriptive terms associated with the event in the event data store. The system can obtain search results for each search query and, if more than one search query has been issued, intersect the results. The system can then select the resource identified by the highest-ranked search result in the intersected set of search results as the official web page for the event. As another example, the data stored in the event data store for the event may identify the official web page for the event.

In some implementations, the system computes an entity popularity score as one of the signal scores (310). The entity popularity score is a measure of popularity of entities that have been classified as being relevant to the event. In order to compute the entity popularity score, the system can provide a text summary of the event to a system that maps text to entities that are topical to the text and, optionally, assigns each entity a topicality score and a confidence score. The system then computes the entity popularity score based on the global popularity of the obtained entities. The global popularity of the obtained entities can be determined based on a number of search queries that include a reference to the entity that have been submitted to a search engine.

In some implementations, the system computes an event category score as one of the signal scores (312). In order to compute the event category score, the system obtains data, e.g., from the event data store, identifying an event category to which the event belongs. The system can then determine whether the category has been previously classified as a promoted or demoted category. For example, trade shows may be classified as a demoted category because they tend to appeal to a limited audience, while festivals and fairs may be classified as a promoted category because they tend to appeal to a broader audience but may not be well-publicized. The system can then assign a default event category score to the event if the category is not a promoted or demoted category, assign a promoted event category score to the event if the category is a promoted category, and assign a demoted event category score to the event if the category is a demoted category.

In some implementations, the system computes a ranking score as one of the signal scores (314). The ranking score is a measure of how well represented the event is in resources identified by search results for a search query that indicates an interest in events in the location in which the event takes place. For example, the search query may be a search query that includes a term that identifies a location and another term that indicates an interest in events occurring in the location, e.g., "events in san francisco" or "san francisco events."

In order to compute the ranking score, the system obtains search results for the search query from a search engine. The obtained search results are ranked according to scores generated by the search engine. The system can then compute the ranking score based on a position in the ranking of search results of the highest-ranked search result that identifies a resource that mentions the event, the number of mentions of the event in resources identified by a pre-determined number of highest-ranked search results, or both.

For example, the ranking score RS can be computed such that:

$$RS = 1 + \frac{1}{srp} + \min\left(K_a, \frac{nm}{K_b}\right),$$

where $K_a$ and $K_b$ are constants, srp is the position of the highest-ranked search result that identifies a resource that mentions the event, and nm is the number of mentions of the event in resources identified by the pre-determined number of highest-ranked search results.

In some implementations, the system computes a venue score as one of the signal scores (316). The venue score is a measure of the prominence of the venue at which the event is hosted. If the event is not associated with a venue, e.g., a marathon or a street fair, the system can assign the event a default venue score. The system can compute the venue score based on any of a variety of factors. For example, the system can compute the venue score based in part on a ranking of the venue of in a ranking of local places or local venues obtained from a local search engine. As another example, the system can compute the venue score based in part on a seating capacity of the venue, i.e., so that events held in venues with larger seating capacities are assigned larger venue scores. As another example, the system can compute the venue score based in part on the popularity of other events in the venue, i.e., so that events held in venues that tend to host more popular events are assigned higher venue scores.

The system combines the signal scores to generate the popularity score for the event (318). For example, the popularity score for the event can be the sum of the signal scores, the product of the signal scores, or an average of the signal scores.

Figure 4:
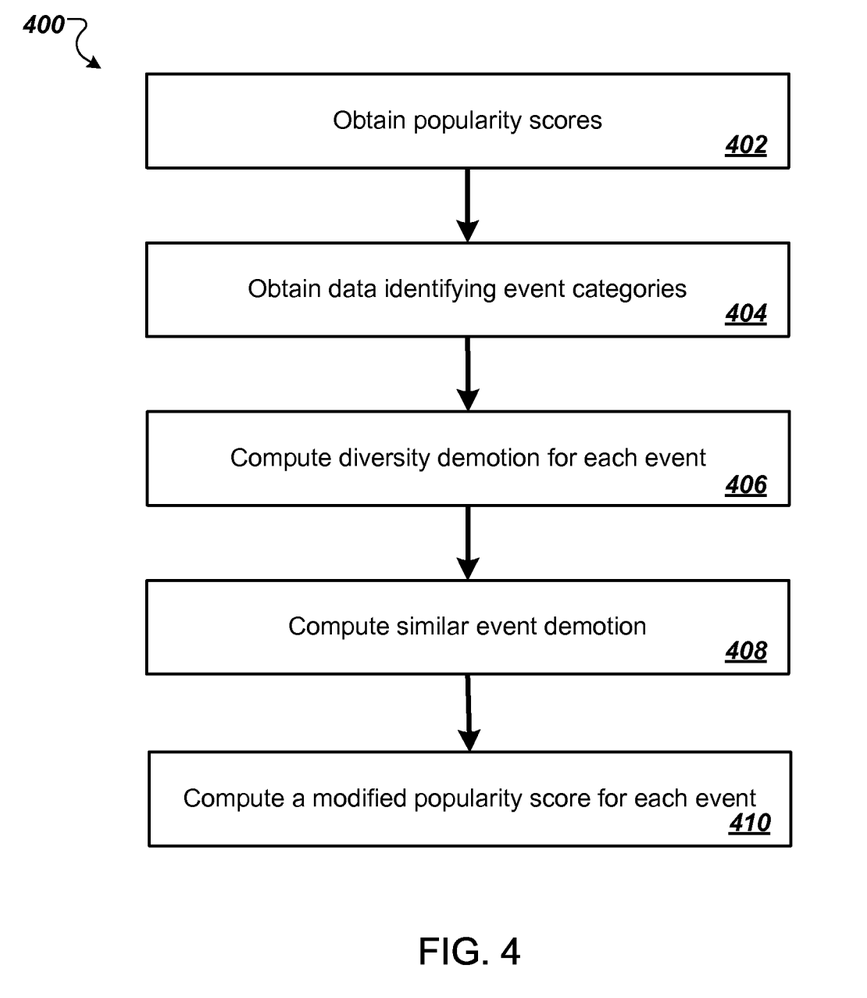
FIG. 4 is a flow diagram illustrating an example technique for computing modified popularity scores for events.

FIG. 4 is a flow diagram illustrating an example technique 400 for generating modified popularity scores for events. The technique 400 can be performed by one or more data processing apparatus. For example, an event ranking system (e.g., the event ranking system 120 of FIG. 1) can be used to perform the technique 300.

The system obtains popularity scores for events occurring in a particular location (402).

The system obtains data identifying an event category to which each of the events belongs (404). The system can obtain the data from, e.g., an event data store, e.g., the event data store 130 of FIG. 1.

The system computes a diversity demotion for each event (406). The system can calculate the diversity demotion for an event based on a count of events that belong to the same category as the event and are above the event in a ranking of events according to their popularity scores. For example, the system can compute the diversity demotion DD such that:

$$DD = K^x,$$

where K is a constant value between zero and one, and x is the count of events that belong to the same category as the event and are above the event in the ranking of events according to their popularity scores.

The system computes a similar event demotion for each event (408). The system can calculate the similar event demotion for an event based on a count of similar events to the event that are above the event in the ranking of events according to their popularity scores. A similar event may be another occurrence of the event, i.e., if the event is a recurring event. Optionally, two events that are hosted at the same venue, belong to the same category, and occur on the same day may also be considered to be similar events. For example, two rock concerts at the same concert venue on the same day may be considered similar events.

The system can compute the similar event demotion SED such that:

$$SED = \frac{R}{y},$$

where R is a constant value, and y is the count of events that are similar to the event and are above the event in the ranking of events according to their popularity scores.

The system computes a modified popularity score for each event (410). The system computes the modified popularity score for an event by applying the diversity demotion and the similar event demotion computed for the event to the popularity score. For example, the modified popularity score for an event can be the product of the popularity score for the event, the diversity demotion for the event, and the similar event demotion for the event. As another example, the system can compute the modified popularity score by subtracting the diversity demotion and the similar event demotion from the popularity score.

In some implementations, instead of modifying scores of certain events, the system can filter the events from the ranking. For example, the system can remove events having diversity demotion or similarity event demotions that are above a particular threshold value from the ranking.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving data identifying a physical location;
   obtaining data identifying a plurality of events occurring in the physical location during a particular time period;
   computing a respective plurality of signal scores for each of the events, wherein computing the respective plurality of signal scores for each of the events comprises:
      obtaining search results for a search query that includes a first term identifying the physical location and a second term indicating an interest in events occurring in the physical location;
      determining a position in a ranking of the search results of a highest-ranked search result that mentions the event;
      determining a frequency with which the event is mentioned in resources identified by the search results; and
      using the position of the highest-ranked search result and the frequency with which the event is mentioned in resources identified by the search results to compute a first signal score of the plurality of signal scores for the event;
   computing a respective popularity score for each of the plurality of events by combining the respective plurality of signal scores for the event; and
   generating a ranking of events occurring in the physical location during the particular time period based at least in part on the popularity scores.

2. The method of claim 1, wherein generating the ranking of events occurring in the physical location during the particular time period based on the popularity scores comprises:
   generating an initial ranking of events based on the popularity scores;
   computing a respective modified popularity score for each of the events based on the initial ranking; and
   generating the ranking of events occurring in the physical location by ranking the events according to the modified popularity scores.

3. The method of claim 2, wherein computing the modified popularity score for each of the events comprises:
   obtaining data identifying a respective category to which each of the events belongs;
   computing a respective demotion value for each of the events based at least in part on a count of higher-ranked events belonging to the same category as the event, wherein the higher-ranked events are events ranked above the event in the initial ranking of events; and
   generating the respective modified popularity score for each of the events by applying the demotion value for the event to the popularity score for the event.

4. The method of claim 3, wherein computing the respective demotion value for each of the events comprises:
   computing the respective demotion value based in part on a count of higher-ranked events that are similar events to the event.

5. The method of claim 1, wherein computing the respective plurality of signal scores for each of the events further comprises:
   determining, of the Internet sites including at least one mention of the event, a number that have been classified as ticket selling sites; and
   computing a second signal score based at least in part on the count of Internet sites including at least one mention of the event and the number that have been classified as ticket selling sites.

6. The method of claim 1, wherein computing the respective plurality of signal scores for each of the events further comprises:
   determining whether the event has an official web page;
   when the event has an official web page,
      determining a peak number of user selections of the official web page over a predetermined duration of time;
      determining a measure of relevance of the official web page to the event; and
      computing a third signal score of the plurality of signal scores for the event based at least in part on the peak number of user selections and the relevance measure.

7. The method of claim 1, wherein computing the respective plurality of signal scores for each of the events further comprises:
   obtaining data identifying one or more entities that are relevant to the event;
   determining a measure of global popularity of each of the entities; and
   computing a fourth signal score of the plurality of signal scores for the event based at least in part on the measures of global popularity of the entities that are relevant to the event.

8. The method of claim 1, wherein computing the respective plurality of signal scores for each of the events further comprises:
   obtaining data identifying one or more event categories that are relevant to the event;
   determining whether any of the event categories that are relevant to the event have been classified as promoted or demoted categories; and
   computing a fifth signal score of the plurality of signal scores for the event based at least in part on whether any of the event categories have been classified as promoted or demoted categories.

9. The method of claim 1, wherein the first signal score is computed from a count of how many times the event is mentioned in resources identified by the search results and a multiplicative inverse of the position in the ranking of the highest-ranked search result that mentions the event.

10. The method of claim 1, wherein computing the respective plurality of signal scores for each of the events further comprises:
    obtaining data identifying a venue hosting the event;
    obtaining data identifying a seating capacity of the venue; and
    computing a sixth signal score of the plurality of signal scores for the event based at least in part on the seating capacity of the venue.

11. A system comprising:
    one or more data processing apparatus; and
    one or more computer-readable storage devices having stored thereon instructions that, when executed by the one or more data processing apparatus, cause the one or more data processing apparatus to perform operations comprising:
    receiving data identifying a physical location;
    obtaining data identifying a plurality of events occurring in the physical location during a particular time period;
    computing a respective plurality of signal scores for each of the events, wherein computing the respective plurality of signal scores for each of the events comprises:
        obtaining search results for a search query that includes a first term identifying the physical location and a second term indicating an interest in events occurring in the physical location;
        determining a position in a ranking of the search results of a highest-ranked search result that mentions the event;
        determining a frequency with which the event is mentioned in resources identified by the search results; and
        using the position of the highest-ranked search result and the frequency with which the event is mentioned in resources identified by the search results to compute a first signal score of the plurality of signal scores for the event;
    computing a respective popularity score for each of the plurality of events by combining the respective plurality of signal scores for the event; and
    generating a ranking of events occurring in the physical location during the particular time period based at least in part on the popularity scores.

12. The system of claim 11, wherein generating the ranking of events occurring in the physical location during the particular time period based on the popularity scores comprises:
    generating an initial ranking of events based on the popularity scores;
    computing a respective modified popularity score for each of the events based on the initial ranking; and
    generating the ranking of events occurring in the physical location by ranking the events according to the modified popularity scores.

13. The system of claim 12, wherein computing the modified popularity score for each of the events comprises:
    obtaining data identifying a respective category to which each of the events belongs;
    computing a respective demotion value for each of the events based at least in part on a count of higher-ranked events belonging to the same category as the event, wherein the higher-ranked events are events ranked above the event in the initial ranking of events; and
    generating the respective modified popularity score for each of the events by applying the demotion value for the event to the popularity score for the event.

14. The system of claim 13, wherein computing the respective demotion value for each of the events comprises:
    computing the respective demotion value based in part on a count of higher-ranked events that are similar events to the event.

15. The system of claim 11, computing the respective plurality of signal scores for each of the events further comprises:
    determining, of the Internet sites including at least one mention of the event, a number that have been classified as ticket selling sites; and
    computing a second signal score based at least in part on the count of Internet sites including at least one mention of the event and the number that have been classified as ticket selling sites.

16. A computer-readable storage device having stored thereon instructions, which, when executed by data processing apparatus, cause the data processing apparatus to perform operations comprising:
    receiving data identifying a physical location;
    obtaining data identifying a plurality of events occurring in the physical location during a particular time period;
    computing a respective plurality of signal scores for each of the events, wherein computing the respective plurality of signal scores for each of the events comprises:
        obtaining search results for a search query that includes a first term identifying the physical location and a second term indicating an interest in events occurring in the physical location;
        determining a position in a ranking of the search results of a highest-ranked search result that mentions the event;
        determining a frequency with which the event is mentioned in resources identified by the search results; and
        using the position of the highest-ranked search result and the frequency with which the event is mentioned in resources identified by the search results to compute a first signal score of the plurality of signal scores for the event;

computing a respective popularity score for each of the plurality of events by combining the respective plurality of signal scores for the event; and generating a ranking of events occurring in the physical location during the particular time period based at least in part on the popularity scores.

17. The computer-readable storage device of claim 16, wherein generating the ranking of events occurring in the physical location during the particular time period based on the popularity scores comprises:

generating an initial ranking of events based on the popularity scores;

computing a respective modified popularity score for each of the events based on the initial ranking; and generating the ranking of events occurring in the physical location by ranking the events according to the modified popularity scores.

18. The computer-readable storage device of claim 17, wherein computing the modified popularity score for each of the events comprises:

obtaining data identifying a respective category to which each of the events belongs;

computing a respective demotion value for each of the events based at least in part on a count of higher-ranked events belonging to the same category as the event, wherein the higher-ranked events are events ranked above the event in the initial ranking of events; and generating the respective modified popularity score for each of the events by applying the demotion value for the event to the popularity score for the event.

19. The computer-readable storage device of claim 18, wherein computing the respective demotion value for each of the events comprises:

computing the respective demotion value based in part on a count of higher-ranked events that are similar events to the event.

20. The computer-readable storage device of claim 16, wherein computing the respective plurality of signal scores for each of the events further comprises:

determining, of the Internet sites including at least one mention of the event, a number that have been classified as ticket selling sites; and computing a second signal score based at least in part on the count of Internet sites including at least one mention of the event and the number that have been classified as ticket selling sites.

21. The system of claim 11, wherein the first signal score is computed from a count of how many times the event is mentioned in resources identified by the search results and a multiplicative inverse of the position in the ranking of the highest-ranked search result that mentions the event.

22. The computer-readable storage device of claim 16, wherein the first signal score is computed from a count of how many times the event is mentioned in resources identified by the search results and a multiplicative inverse of the position in the ranking of the highest-ranked search result that mentions the event.

23. The method of claim 1, wherein the first signal score is computed from the position in the ranking of the highest-ranked search result that mentions the event and a minimum of a threshold value and a value derived from a count of how many times the event is mentioned in resources identified by the search results.

24. The system of claim 11, wherein the first signal score is computed from the position in the ranking of the highest-ranked search result that mentions the event and a minimum of a threshold value and a value derived from a count of how many times the event is mentioned in resources identified by the search results.

25. The computer-readable storage device of claim 16, wherein the first signal score is computed from the position in the ranking of the highest-ranked search result that mentions the event and a minimum of a threshold value and a value derived from a count of how many times the event is mentioned in resources identified by the search results.

* * * * *